(12) United States Patent
Santana

(10) Patent No.: US 12,107,887 B2
(45) Date of Patent: Oct. 1, 2024

(54) BESPOKE HONEYPOT (CHIMAERA) FOR NETWORK SECURITY

(71) Applicant: El Orangutan, LLC, Annapolis, MD (US)

(72) Inventor: Mario D. Santana, Annapolis, MD (US)

(73) Assignee: El Orangutan, LLC, Annapolis, MD (US)

( * ) Notice: Subject to any disclaimer, the term of this patent is extended or adjusted under 35 U.S.C. 154(b) by 618 days.

(21) Appl. No.: 16/945,771

(22) Filed: Jul. 31, 2020

(65) Prior Publication Data

US 2022/0038499 A1    Feb. 3, 2022

(51) Int. Cl.
*H04L 29/06* (2006.01)
*H04L 9/40* (2022.01)

(52) U.S. Cl.
CPC ...... *H04L 63/1491* (2013.01); *H04L 63/0236* (2013.01); *H04L 63/102* (2013.01); *H04L 63/1416* (2013.01); *H04L 63/1425* (2013.01); *H04L 63/20* (2013.01)

(58) Field of Classification Search
CPC ............. H04L 63/1491; H04L 63/0236; H04L 63/102; H04L 63/1416; H04L 63/1425; H04L 63/20
See application file for complete search history.

(56) References Cited

U.S. PATENT DOCUMENTS

| 9,705,920 B1 * | 7/2017 | Ramalingam ........... G06F 21/54 |
| 10,574,698 B1 * | 2/2020 | Sharifi Mehr ...... H04L 63/1491 |
| 11,233,823 B1 * | 1/2022 | Venkataramani ... H04L 63/1491 |

(Continued)

FOREIGN PATENT DOCUMENTS

WO    WO-2018044410 A1 *    3/2018

OTHER PUBLICATIONS

Alexander Kedrowitsch, Danfeng Yao, Gang Wang, Kirk Cameron. 2017. A First Look: Using Linux Containers for Deceptive Honeypots. Proceedings of the 2017 Workshop on Automated Decision Making for Active Cyber Defense (SafeConfig '17). Association for Computing Machinery, New York, NY, USA (8 pages) (Year: 2017).*

*Primary Examiner* — Joseph P Hirl
*Assistant Examiner* — Thomas A Gyorfi
(74) *Attorney, Agent, or Firm* — CRGO Global; Steven M. Greenberg

(57) ABSTRACT

A network security method utilizing a bespoke honeypot includes first duplicating a protected image of a network accessible application from a primary container in which the protected image executes into a secondary container as a duplicated image. The method further includes modifying data in the duplicated image to different values than corresponding values in the protected image while retaining a same format as the values of the protected image, thereby forming a bespoke honeypot or chimaera. Thereafter, the method includes detecting an attempted intrusion in the protected image of the primary container and, in response to the detection, identifying a network source of the attempted intrusion, routing subsequent requests from the identified network source to the duplicated image in the secondary container and logging interactions between the identified network source and the duplicated image.

14 Claims, 2 Drawing Sheets

(56) References Cited

U.S. PATENT DOCUMENTS

| | | | |
|---|---|---|---|
| 11,290,492 B2* | 3/2022 | Wolfson | H04L 63/1491 |
| 2017/0180421 A1* | 6/2017 | Shieh | H04L 63/10 |
| 2018/0191755 A1* | 7/2018 | Monaco | H04L 63/1425 |
| 2021/0058428 A1* | 2/2021 | Arlitt | H04L 63/1416 |
| 2021/0194853 A1* | 6/2021 | Xiao | H04L 63/0281 |

* cited by examiner

BESPOKE HONEYPOT (CHIMAERA) FOR NETWORK SECURITY

BACKGROUND OF THE INVENTION

Field of the Invention

The present invention relates to the field of network security and more particularly, to the use of a honeypot methodology in defending a protected application in a computer communications environment.

Description of the Related Art

Network security refers to the policies and practices that one adopts in order to prevent the unauthorized access by an intruder to a protected resource accessible over a computer communications network. Network security as a broad field of technology, encompasses several different types of tools and activities, including user authentication, data encryption and security, permissions-based access control, intrusion detection and attack remediation. Generally, a robust combination of the foregoing, addressing each area of network security, acts to combat breaches of network security. Even still, the threat of a breach never ends as attackers constantly seek flaws in contemporaneously deployed sets of these tools.

Much of the exercise of network security involves learning the behavior of actual malicious actors in order to recognize patterns of intrusion. These patterns of intrusion are then used to configure intrusion detection tools, namely monitors, in order to detect future attacks on a wide range of vulnerable computing resources. Maintaining the ability to observe the actual behavior of an attacker without the attacker becoming aware of such observation, though, is not a simple task. One way in which an attacker may be monitored unbeknownst to the attacker is a honeypot.

A honeypot is a decoy network-accessible resource, that may be deployed in a network as a surveillance and early-warning tool, without any other legitimate purpose. As one attempts to gain access to the honeypot, it may be presumed that the individual seeking access is an unauthorized "hacker" and thus, the techniques used by the individual to gain access to the honeypot may be studied in order to learn new exploitation techniques. Plainly, such analysis may be used to further tighten security of an actual network resource that is protected by the honeypot. As well, it will be understood that the honeypot directs the attention of the attacker away from a legitimate resource in so far as the honeypot encourages the attacker to spend time and energy on the decoy server while remaining distracted from the data on a protected server.

Even still, the use of a honeypot is limited to studying generic attack techniques of the attacker. The honeypot, however, cannot inform the observer as to the specific use of such techniques on a protected application as the traditional honeypot deploys a completely different application than that which is protected so as to create larger attack surface. As well, the use of the honeypot cannot inform the observer as to the specific vulnerabilities of the protected application. Consequently, the way in which an attacker might capitalize upon the intrinsic vulnerabilities of the protected application remain unknown to the observer.

BRIEF SUMMARY OF THE INVENTION

Embodiments of the present invention address deficiencies of the art in respect to network security and provide a novel and non-obvious method, system and computer program product for a bespoke honeypot for network security. In an embodiment of the invention, a network security method utilizing a bespoke honeypot includes first duplicating a protected image of a network accessible application from a primary container in which the protected image executes into a secondary container as a duplicated image. The method further includes modifying data in the duplicated image to different values than corresponding values in the protected image while retaining a same format as the values of the protected image, thereby forming a bespoke honeypot or chimaera. Thereafter, the method includes detecting an attempted intrusion in the protected image of the primary container, for example, an attempt to complete a field in a user interface to the network accessible application with a database operation or a change content of an exchanged token between the network source and the protected image of the network accessible application. Then, in response to the detection, identifying a network source of the attempted intrusion, routing subsequent requests from the identified network source to the duplicated image in the secondary container and logging interactions between the identified network source and the duplicated image.

In one aspect of the embodiment, the modification of the data includes changing original numeric values personally identifying individuals to different numeric values while maintaining a same format for the different numeric values as the original numeric values. In another aspect of the embodiment, the modification of the data includes changing original numeric values each corresponding to respective financial account to different numeric values while maintaining a same format for the different numeric values as the original numeric values. In yet another aspect of the embodiment, the identification of the network source may include identifying an Internet protocol address of the network source or a portion of a request header received from the network source.

In another embodiment of the invention, a data processing system may be configured for network security. The system includes a host computing platform that has one or more computers, each with memory and at least one processor, and that supports an execution of an application container in the memory of the host computing platform. The system also includes a network security module that includes computer program instructions that when executed by at least one of the processors of the host computing platform, duplicates a protected image of a network accessible application as a duplicated image, from a primary container in which the protected image executes, into the container supported during execution in the memory of the host computing platform, modifies data in the duplicated image to different values than corresponding values in the protected image while retaining a same format as the values of the protected image, detects an attempted intrusion in the protected image of the primary container and, in response to the detection, identifies a network source of the attempted intrusion, routes subsequent requests from the identified network source to the duplicated image in the container supported during execution in the memory of the host computing platform, and logs interactions between the identified network source and the duplicated image.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a bespoke honeypot for network security. In accordance with an embodiment of the invention, a protected image of an application executing within a primary container may be duplicated and placed for execution in a secondary container. The data of the duplicated image of the application in the secondary container is then modified include values that are different than corresponding values in the protected image, but the format of the data is to remain identical in both the protected image and the duplicate image so as to have created a chimaera.

Thereafter, upon detecting an attempted intrusion upon the protected image of the application by an identifiable network source—an attacker—subsequent requests received from the attacker are routed not to the protected image in the primary container, but to the chimaera. The attacker, then, will remain unawares of the diversion to the chimaera as the chimaera by all accounts appears to be the protected application excepting for the modified data. Consequently, interactions between the attacker and the chimaera are logged to provide useful observation of the behavior of the attacker.

Figure 1:
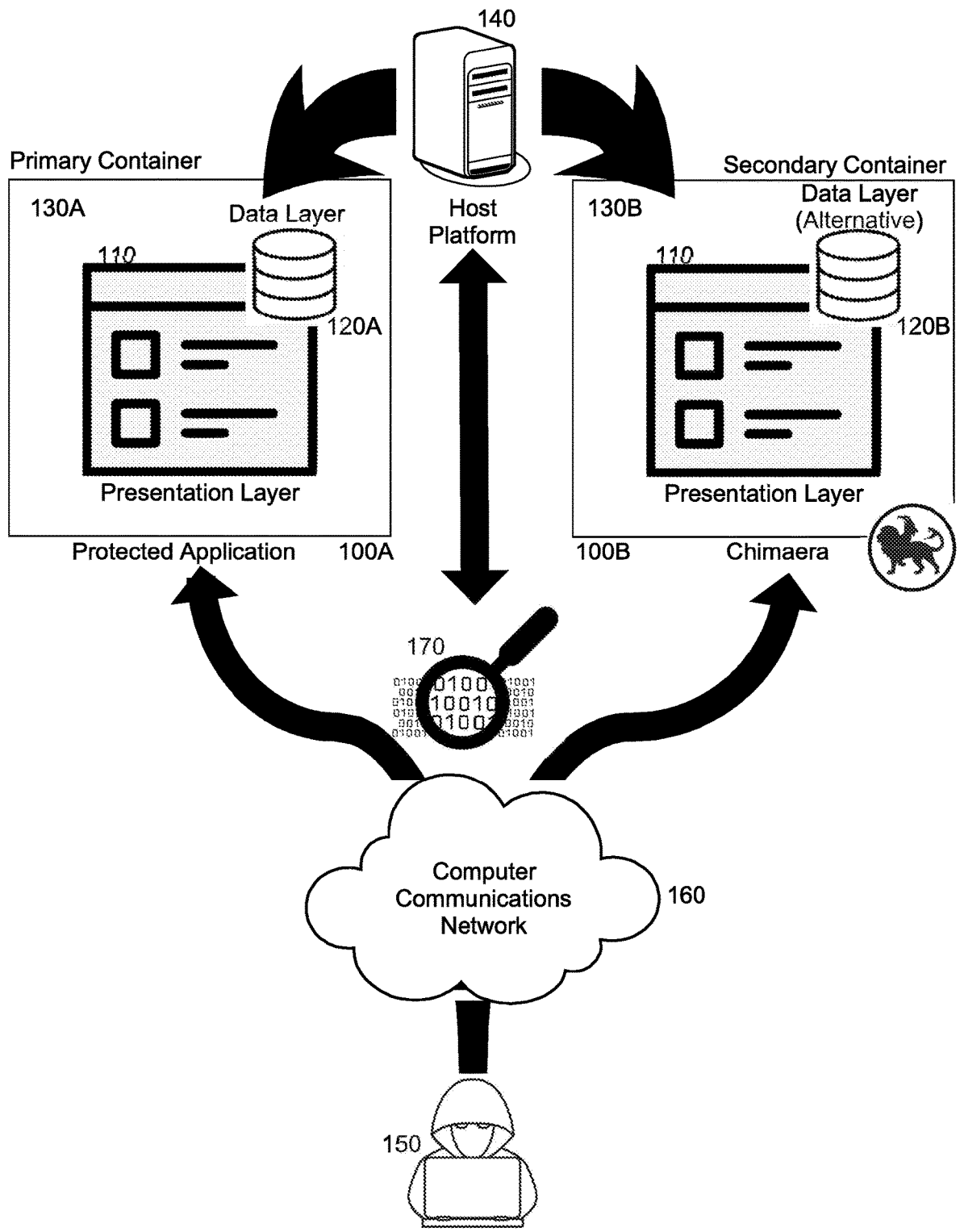
FIG. 1 is pictorial illustration of a process for deploying a bespoke honeypot in furtherance of network security.

In further illustration, FIG. 1 pictorially shows a process for deploying a bespoke honeypot in furtherance of network security. As shown in FIG. 1, a host computing platform 140 of one or more computers with memory and at least one processor manages two separate containers 130A, 130B in which two different images 100A, 100B of the same application execute separately and independently with an identical presentation layer 110—namely an identical user interface. But, one of the images 100B—a chimaera or bespoke honeypot—includes different data 120B than the data 120A of the image 100A forming the protected application.

In this regard, the chimaera one of the images 100B may be an actual executing instance of the same application as the protected one of the images 100A, or the chimaera may be a dynamic process supported by underlying data so as to impart the impression of an actual executing instance of the same application. In regard to the latter, during a learning phase, incoming requests to the protected one of the images 100A may be logged along with corresponding responses. The incoming requests may be characterized according to various request characteristics such as request address, request parameters and request headers. In this way, each response can be retrieved with one or more characteristics of a corresponding request. Optionally, instead of storing entire request/response pairs, only differences between different characteristics of each request and corresponding differences in responses may be stored for the purpose of data storage conservation.

As such, when a malicious actor 150 attempts to access the protected one of the images 100A, the host computing platform 140 detects the attempt and reroutes all subsequent requests 170 from the malicious actor 150 to the chimaera one of the images 100B. In particular, the subsequent requests 170 may be processed directly within the chimaera one of the images 100B to the extent that the chimaera one of the images 100B is an actual instance of the same application as the protected one of the images 100A. Alternatively, each one of the subsequent requests 170 may be characterized with the characterization being used as a key to locate a corresponding best matching characterization and to retrieve a correspondingly stored response which then may be provided to the malicious actor 150.

More specifically, the stored response may be provided, or a modified form of the response may be provided including modifications corresponding to the subsequent one of the requests 170. As another alternative, portions of the stored response may be parsed to identify portions known through pattern detection and matching to correspond to personally identifying information or sensitive financial information. Then, only these portions may be modified algorithmically into different data and provided as a response. For instance, digits in a social security number may be changed, or letters in text may be transformed algorithmically.

As well, so that the operational phase and learning phase may co-execute, for each one of the subsequent requests 170, the host computing platform 140 logs the requests 170 so that the behavior of the malicious actor 150 may be observed unbeknownst to the malicious actor 150 since the presentation layer 100—the formatting of the different data 120B, in particular—remains identical to that of the image 100A forming the protected application.

Figure 2:
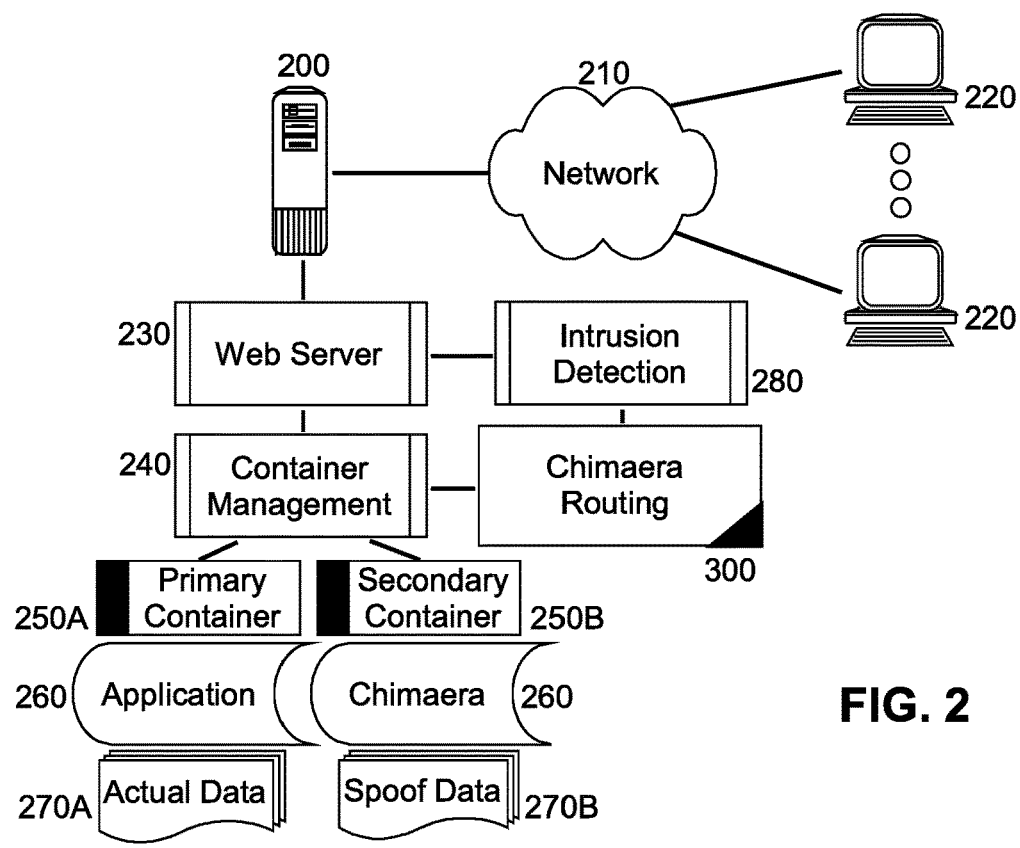
FIG. 2 is a schematic diagram illustrating a data processing system configured with a bespoke honeypot for network security; and, FIG. 3 is a flow chart illustrating a process for using a bespoke honeypot in furtherance of network security.

The process described in connection with FIG. 1 may be implemented within a data processing system. In further illustration, FIG. 2 schematically shows a data processing system configured with a bespoke honeypot for network security. The system includes a host computing platform 200 that includes one or more computers, each with memory and at least one processor. The host computing platform 200 is communicatively linked to different computing clients 220 from over computer communications network 210. The host computing platform 200 further supports the operation of a Web server 230 enabled to server different Web pages over the computer communications network 210 to requesting ones of the computing clients 220.

The Web server 230 is coupled to a container management application 240 adapted to create and maintain operation of different containers 250A, 250B in which different computer programs may execute independently of one another. To that end, each of the containers 250A, 250B can be a short-lived Linux container, or a virtual machine, such that the container management application 240 is a hypervisor. A primary 250A one of the containers 250A, 250B hosts the execution of a protected application 260 including corresponding data 270A. A secondary 250B one of the containers 250A, 250B hosts the execution of chimaera 260 image of the application 260 with modified data 270B.

Importantly, the modified data 270A, while different than the corresponding data 270, maintains an identical formatting as the corresponding data 270A of the protected application 260. For example, the modified data 270B can include changes to original numeric values that personally identify individuals of the corresponding data 270A, while preserving a same format for the different numeric values as the original numeric values. Alternatively, the modified data 270B can include changes to the original numeric values each corresponding to a respective financial account of the corresponding data 270A, while preserving the same format for the different numeric values as the original numeric values.

Of note, a chimaera routing module 300 is coupled to the container management application 240 and also to an intrusion detection system 280 adapted to detect actions performed by ones of the computing clients 220 indicative of an intrusion, for instance an attempt to complete a field in a user interface to the protected application 260 with a database operation, or a changing of content of an exchanged token with the protected application 260. The chimaera routing module 300 includes computer program instructions enabled upon execution in the host computing platform 200 to respond to a detection of an attempted intrusion by identifying the source one of the computing clients 220 issuing the request resulting in the detection, for example by Internet protocol address or by at least a portion of a header of the request. The program instructions additionally are enabled to record the identity of the source one of the computing clients and to route future requests from the source one of the computing clients to the chimaera 260, while recording the requests or a portion thereof in a log.

Figure 3:
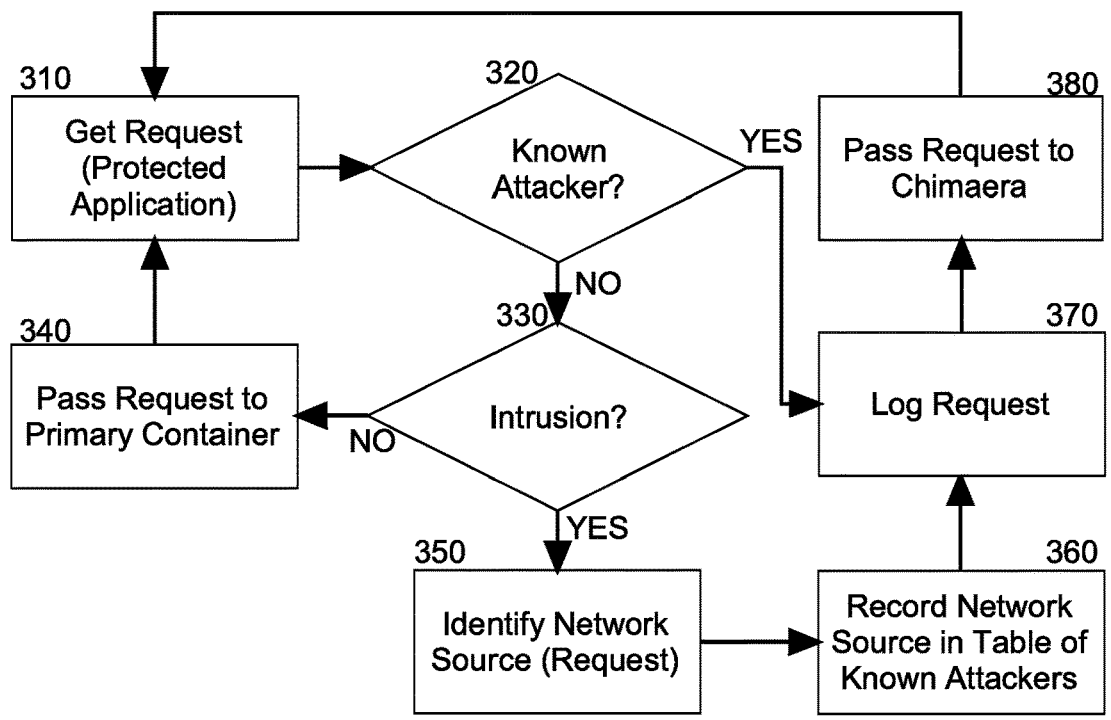

In even yet further illustration of the operation of the chimaera routing module 300, FIG. 3 is a flow chart illustrating a process for using a bespoke honeypot in furtherance of network security. Beginning in block 310, a request is received to access the protected application. In decision block 320, the requestor is identified and it is determined whether or not the Internet protocol address, or a portion of a header of the requests corresponds to a known attacker previously identified as a malicious actor in reference to a table of known attackers. If not, in decision block 330, it is determined if the behavior of the requestor implicates an intrusion, for instance an attempt to complete a field in a user interface to the protected application with a database operation, or a changing of content of an exchanged token with the protected application. If not, the request is then routed to the protected application in block 340 and the process then returns to block 310 with a receipt of a next request.

In decision block 320, if the request is determined to have been received from a known attacker according to the table of known attackers, then in block 370 the request is logged for subsequent analysis and in block 380 the request is routed not to the protected application but to the chimaera image of the application. Thereafter, the process returns to block 310 with the receipt of a next request. In decision block 320, if it is determined that the requestor is not previously known as an attacker, but in decision block 330 the actions of the requestor are indicative of an attempted intrusion, in block 350 the requestor is identified and in block 360 the identity of the attacker is recorded in a table of known attackers. Thereafter, in block 370 the request is logged for subsequent analysis and in block 380 the request is routed to the chimaera image of the application.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

1. A network security method comprising:
   duplicating a protected image of a presentation layer of a network accessible application from a primary container in which the protected image executes into a secondary container as a duplicated image and duplicating data for the network accessible application in the primary container into the secondary container for use by the duplicated image, but changing values of the duplicated data while maintaining a formatting of the duplicated data in the secondary container by applying an algorithmic formula to the data of the network accessible application in the primary container to transform the data of the network accessible application into the changed values;
   logging incoming requests to the protected image of the primary container along with corresponding responses to the incoming requests produced by the protected image of the primary container, characterizing the incoming requests according to request characteristics including request address, one or more request parameters and one or more request headers and storing the requests and corresponding responses including data in association with the request characteristics into a request-response table;
   detecting an attempted intrusion in the protected image of the primary container; and,
   responsive to the detection,
      identifying a network source of the attempted intrusion,
      routing subsequent requests from the identified network source to the duplicated image in the secondary container,
      for each one of the subsequent requests, characterizing the one of the subsequent requests, mapping the characterization of the one of the subsequent requests to a pre-stored response with data in the request-response table, modifying the data in the pre-stored response to include different values while retaining a same format as corresponding values of the protected image by transforming original alphanumeric characters in the data algorithmically into differing alphanumeric characters but maintaining a same format of the differing alphanumeric characters as the original alphanumeric characters; and
      logging interactions between the identified network source and the duplicated image.

2. The method of claim 1, wherein the detected attempted intrusion is an attempt to complete a field in a user interface to the network accessible application with a database operation.

3. The method of claim 1, wherein the detected attempted instruction is a change content of an exchanged token between the network source and the protected image of the network accessible application.

4. The method of claim 1, wherein the identification of the network source comprises identifying an Internet protocol address of the network source.

5. The method of claim 1, wherein the identification of the network source comprises identifying a portion of a request header received from the network source.

6. A data processing system configured for network security, the system comprising:
   a host computing platform comprising one or more computers, each with memory and at least one processor, the host computing platform supporting an execution of an application container in the memory of the host computing platform; and,
   a network security module comprising computer program instructions that when executed by at least one of the processors of the host computing platform, performs:
   duplicating a protected image of a network accessible application from a primary container in which the protected image executes into a secondary container as a duplicated image and duplicating data for the network accessible application in the primary container into the secondary container for use by the duplicated image, but changing values of the duplicated data while maintaining a formatting of the duplicated data in the secondary container by applying an algorithmic formula to the data of the network accessible application in the primary container to transform the data of the network accessible application into the changed values;
   logging incoming requests to the protected image of the primary container along with corresponding responses to the incoming requests produced by the protected image of the primary container, characterizing the incoming requests according to request characteristics including request address, one or more request parameters and one or more request headers and storing the requests and corresponding responses including data in association with the request characteristics into a request-response table;
   detecting an attempted intrusion in the protected image of the primary container; and,
   responsive to the detection,
      identifying a network source of the attempted intrusion, routing subsequent requests from the identified network source to the duplicated image in the secondary container for each one of the subsequent requests, characterizing the one of the subsequent requests, mapping the characterization of the one of the subsequent requests to a pre-stored response with data in the request-response table, modifying the data in the prestored response to include different values while retaining a same format as corresponding values of the protected image by transforming original alphanumeric characters in the data algorithmically into differing alphanumeric characters but maintaining a same format of the differing alphanumeric characters as the original alphanumeric characters; and logging interactions between the identified network source and the duplicated image.

7. The system of claim 6, wherein the detected attempted intrusion is an attempt to complete a field in a user interface to the network accessible application with a database operation.

8. The system of claim 6, wherein the detected attempted instruction is a change content of an exchanged token between the network source and the protected image of the network accessible application.

9. The system of claim 6, wherein the identification of the network source comprises identifying a portion of a request header received from the network source.

10. A computer program product for network security, the computer program product including a computer readable storage medium having program instructions embodied therewith, the program instructions executable by a device to cause the device to perform a method including:

duplicating a protected image of a network accessible application from a primary container in which the protected image executes into a secondary container as a duplicated image and duplicating data for the network accessible application in the primary container into the secondary container for use by the duplicated image, but changing values of the duplicated data while maintaining a formatting of the duplicated data in the secondary container by applying an algorithmic formula to the data of the network accessible application in the primary container to transform the data of the network accessible application into the changed values;

logging incoming requests to the protected image of the primary container along with corresponding responses to the incoming requests produced by the protected image of the primary container, characterizing the incoming requests according to request characteristics including request address, one or more request parameters and one or more request headers and storing the requests and corresponding responses including data in association with the request characteristics into a request-response table;

detecting an attempted intrusion in the protected image of the primary container; and, responsive to the detection, identifying a network source of the attempted intrusion, routing subsequent requests from the identified network source to the duplicated image in the secondary container for each one of the subsequent requests, characterizing the one of the subsequent requests, mapping the characterization of the one of the subsequent requests to a pre-stored response with data in the request-response table, modifying the data in the prestored response to include different values while retaining a same format as corresponding values of the protected image by transforming original alphanumeric characters in the data algorithmically into differing alphanumeric characters but maintaining a same format of the differing alphanumeric characters as the original alphanumeric characters; and logging interactions between the identified network source and the duplicated image.

11. The computer program product of claim 10, wherein the detected attempted intrusion is an attempt to complete a field in a user interface to the network accessible application with a database operation.

12. The computer program product of claim 10, wherein the detected attempted instruction is a change content of an exchanged token between the network source and the protected image of the network accessible application.

13. The computer program product of claim 10, wherein the identification of the network source comprises identifying an Internet protocol address of the network source.

14. The computer program product of claim 10, wherein the identification of the network source comprises identifying a portion of a request header received from the network source.

* * * * *